United States Patent Office 3,219,673
Patented Nov. 23, 1965

3,219,673
6,6-DIFLUORO-3-KETO-$\Delta^4$ STEROIDS AND THEIR PREPARATION
George A. Boswell, Jr., Newark, Del., assignor to E. I. du Pont de Nemours and Company, Wilmington, Del., a corporation of Delaware
No Drawing. Filed July 25, 1963, Ser. No. 297,709
12 Claims. (Cl. 260—397.3)

This application is a continuation-in-part of my copending application Serial No. 242,382, filed December 5, 1962, now abandoned.

This invention relates to new fluoroketo steroids and to a method for preparing these compounds. More specifically, it concerns new fluoroketo steroids and their preparation.

Since the discovery by Fried and Sabo [J. Am. Chem. Soc. 75, 2273 (1953); 76, 1455 (1954)] that the introduction of a fluorine atom at the 9-position into cortisol resulted in enhanced biological activity, an ever-increasing amount of research has been directed towards synthesizing new types of fluorine-containing steroids and finding new ways of introducing fluorine into the steroid nucleus [for leading references, see, for example, Bowers et al., J. Am. Chem. Soc. 84, 1050 (1962); see also Fieser and Fieser, "Steroids," Reinhold Publishing Corp. 1959, especially at pages 682–699 for fluorocorticoids and 592–597 for fluorosteroids which have anabolic properties (aid to tissue building, protein utilization)].

This intensive work in the field is due to the advantages which frequently accrue from the presence of fluorine in steroidal drugs. The principal advantages accruing from the presence of fluorine include increased potency, decreased toxicity and greater efficacy (for instance high anti-inflammatory activity). Fluorosteroids also having keto or hydroxyl groups on ring carbon atoms have proved to be especially useful in pharmaceutical applications.

The new compounds made available by this invention are steroids containing, as part of the polycyclic steroid structure, the 6,6-difluoro-3-keto-$\Delta^4$ grouping, i.e., the atomic grouping

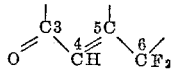

These products are prepared by a process which comprises the following sequence of steps. In the equations given for each step, only the reactive part of the steroid molecule i.e., only the 3- to 6-carbon atoms of the steroid is shown for clarity of presentation and the byproducts, such as SOF$_2$, are omitted for simplicity; R stands for a hydrocarbon radical; A and B are, respectively, hydrogen and annular carbon. The bond emanating from the 3-carbon connects with the 2-carbon, and the bond emanating from the 6-carbon connects with the 7-carbon.

(1) A 3-acyloxy-5-fluoro-6-keto steroid is reacted with sulfur tetrafluoride, whereby the oxo substituent is replaced by two fluorine atoms, in accordance with the equation:

(1) 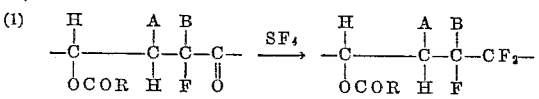

(2) The resulting 3-acyloxy-5,6,6-trifluoro is hydrolyzed in acidic medium, whereby the acyloxy substituent is replaced by hydroxyl, in accordance with the equation:

(2) 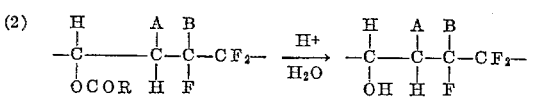

(3) The resulting 5,6,6-trifluoro-3-hydroxy is oxidized to convert the secondary alcohol group to a keto group, in accordance with the equation:

(3) 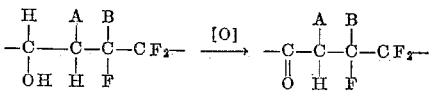

(4) Finally, the resulting 5,6,6-trifluoro-3-keto steroid is treated with a dehydrofluorinating agent, preferably a weak base, such as alumina, whereby dehydrofluorination involving the 5-fluorine atom and the 4-hydrogen occurs and a 6,6-difluoro-3-keto-$\Delta^4$ steroid is formed, in accordance with the equation:

(4) 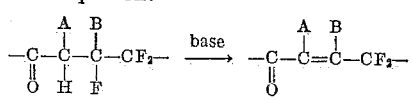

The 6,6-difluoro-3-keto-$\Delta^4$ steroids of this invention may, of course, bear any of the other substituents commonly present in steroidal compounds. Such substituents, which may be attached either to annular carbons or to exocyclic carbons include, for example, hydrocarbon radicals (preferably low alkyl groups) and functional groups such as hydroxy, oxo, acyloxy, ester (hydrocarbyloxycarbonyl) and halogen. Exocyclic unsaturation (ethylenic or acetylenic) or additional intracyclic unsaturation may also be present.

The starting materials in the process of this invention are the 3-acyloxy-5-fluoro-6-keto steroids. Some steroids having this specific configuration have been reported, for example 3β-acetoxy-5α-fluoro-6-ketocholestane (Henbest and Wrigley, J. Chem. Soc. 1957, 4765). Others can be prepared by the method described in the article just referred to. A general process of preparing these 3-acyloxy-5-fluoro-6-keto steroids is described in application Serial No. 233,191, filed on October 23, 1962, by S. Andreades and G. A. Boswell, now abandoned, and replaced by continuation-in-part Serial No. 396,745, filed September 15, 1964. This process consists of (a) reacting nitrosyl fluoride at a temperature not exceeding 50° C., usually in the range of −20 to 5° C., with a 3-acyloxy-$\Delta^5$ steroid whereby a 5-fluoro-6-nitrimino steroid is obtained; and (b) subjecting said fluoronitrimino steroid to hydrolysis, thereby replacing the nitrimino substituent by an oxo substituent and obtaining a 3-acyloxy-5-fluoro-6-keto steroid.

The reaction sequence described above is represented by the following equations in which, for the sake of simplicity, only the position of the steroid molecule entering into reaction is shown:

(a)

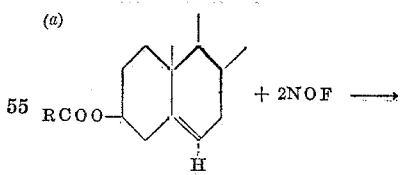

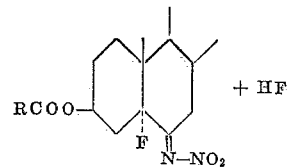

(b)

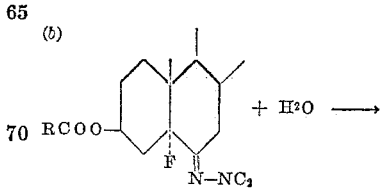

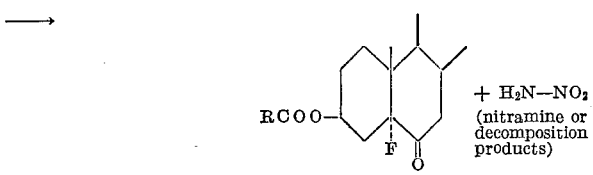

+ H₂N—NO₂
(nitramine or decomposition products)

In this reaction, the nature of the acyloxy group is immaterial since this group is later eliminated and replaced by a keto group, as shown in Equations 1-4 above. Therefore, the least expensive and most available acyloxy groups ar chosen, which are those in which R is a low alkyl group or a phenyl group. Preferably, the acyloxy group is acetoxy.

Other substituents may be present on either intracyclic or exocyclic carbon of the resulting 3-acyloxy-5-fluoro-6-keto steroid, such as those already mentioned above. These substitutes can be initially present on the starting unsaturated steroid since, in general, they are either wholly inert, or not sufficiently reactive with nitrosyl fluoride to prevent fluoronitrimine formation from taking place to a useful extent; or they can be introduced later by appropriate methods. Intracyclic or exocyclic unsaturation may also be present.

The hydrolysis step represented by Equation b above can be conducted by subjecting the nitrimino compound to the action of water, or acidified water, preferably in admixture with a water-miscible organic liquid (e.g., dioxane, methanol, ethanol, acetone, etc.) which is a solvent for the compound to be hydrolyzed. This reaction is slow at ordinary temperature, and it is therefore preferred to operate at elevated temperatures, in the range of 50-100° C. at atmospheric pressure or up to about 150° C. in sealed vessels at superatmospheric pressure. The fluoronitrimino steroid need not be isolated prior to this treatment, which can be applied directly to the product of the reaction between nitrosyl fluoride and the unsaturated steroid after removal of the solvent.

Another hydrolytic procedure is, however, preferred because it makes it possible to hydrolyze the fluoronitrimino steroid rapidly and at room temperature. According to this method, which can be viewed as a chromatographic treatment, a solution of the fluoronitrimino steroid in an inert organic solvent such as diethyl ether, petroleum ether, benzene, etc. is absorbed onto a column of neutral alumina containing water in amount at least stoichiometrically equivalent to the nitrimino group present, i.e., in a molar ratio of at least 1:1 relative to the nitrimino compound. As is known, alumina used in chromatographic work is supplied commercially in various grades whose "activities" depend chiefly on the water content [see, for example, Brockmann and Schodder, Ber. 74, 73 (1941)]. Aluminas of activity II-V, which contain, respectively, 3, 6, 10 and 15% of water by weight, are suitable for the hydrolysis of the fluoronitrimino steroids. More strongly hydrated alumina can be used provided it remains in the state of a freely flowing solid. The most generally suitable material is activity III alumina, which contains 6% of water.

Upon contact with water-containing alumina, hydrolysis of the fluoronitrimino steroid to the corresponding fluoroketo steroid takes place practically instantaneously at room temperature (lower or higher temperatures can be used but there is no advantage in doing so). The resulting fluoroketo steroid is then removed from the adsorbant column by elution with a suitable solvent such as diethyl ether, petroleum ether, benzene, etc., or a mixture of solvents. In the event impurities, by-products or unchanged starting material are present, this operation also serves as a chromatographic separation, in that the products present are eluted at different rates. If several fractions are obtained in this manner, infrared examination makes it possible to determine which fraction contains the desired products.

For reasons of greater accessibility, the 3-acyloxy-5-fluoro-6-keto steroids preferred as starting materials are those which, not including the acyloxy group, contain a total of from 18 to 36 carbon atoms. Especially preferred for the same reason of greater accessibility are the 3-acyloxy-5-fluoro-6-keto steroids of the androstane and pregnane groups.

Having described the general preparation of the 3-acyloxy-5-fluoro-6-keto steroid starting reactants, the following paragraphs describe in detail the steps of the novel process of the invention.

In the first step of the process, sulfur tetrafluoride is reacted with a 3-acyloxy-5-fluoro-6-keto steroid in a mole ratio $SF_4$/steroid of at least 1:1. Preferably, the sulfur tetrafluoride is used in excess, which can be quite large, e.g., up to 100 moles per mole or higher. The reaction is conducted in an inert organic liquid medium which is at least a partial solvent for the reactants and preferably boils below about 100° C. Suitable solvents include the hydrocarbons such as n-hexane, cyclohexane or benzene and the halohydrocarbons such as methylene chloride, chloroform, carbon tetrachloride, tetrachloroethylene, sym - tetrachlorodifluoroethane, perfluorodimethylcyclohexane, etc. The reaction can proceed at temperatures as low as 0° C. or lower. It is preferred not to exceed a temperature of about 100° C. to avoid possible side reactions, and a preferred temperature range is that between 15 and 75° C. The reaction is conducted in sealed vessels, in view of the volatility of sulfur tetrafluoride. A catalyst is not essential but the reaction proceeds much faster in the presence of catalysts known to influence fluorinations of this type, such as boron trifluoride, arsenic trifluoride, phosphorus pentafluoride, titanium tetrafluoride or hydrogen fluoride. Hydrogen fluoride is the preferred catalyst since it has less tendency to promote side reactions. In practice, there is often enough moisture present in the system to hydrolyze a small portion of the sulfur tetrafluoride and form catalytic amounts of hydrogen fluoride, e.g., 1-5% on a molar basis, or a small amount of water can be added to the reaction mixture for this purpose. Larger than catalytic amounts of hydrogen fluoride, e.g., from 10-20% of the sulfur tetrafluoride on a molar basis, can be used, and such larger amounts are often advantageous with the less reactive keto groups.

It is not essential to purify the reaction product prior to the next step. However, this can be done, if desired, by any appropriate method. Chromatography over neutral alumina is particularly effective. This method may occasionally effect partial hydrolysis of the acyloxy group, which of course, does no harm since this group is to be hydrolyzed in any event.

In general, sulfur tetrafluoride will react with all keto groups present in the steroid to a greater or lesser extent, depending on the location and reactivity of the keto groups and on the experimental conditions. Thus, any additional oxo substituent present may also be converted, at least in part, to difluoro substituents, as shown in some of the following examples.

However, if such a replacement is not desired, the oxo group can be first protected by suitable means, for example by conversion to the ethylene ketal, from which the oxo group can be regenerated subsequently. Other reactive groups such as carboxyl or hydroxyl may also be affected to a varying degree, depending on the reaction temperature. In general, they remain unaffected at temperatures below 100° C.

In the second step of the process, 3-acyloxy-5,6,6-trifluoro steroid, with or without prior isolation and purification, is subjected to hydrolysis under acidic conditions. The preferred hydrolytic agents are strong, non-oxidizing aqueous inorganic acids such as hydrochloric acid, sulfuric acid or phosphoric acid. The reaction is preferably conducted in a water-miscible, neutral organic liquid which dissolves the steroid, for example, the 1-3 carbon alkanols, acetone or dioxane. The reaction temperature is not critical and may be as low as 15° C. but the reaction proceeds faster at elevated temperatures, e.g., 50–100° C. There is no advantage in exceeding about 125° C. The reaction product can be isolated in any appropriate manner, such as evaporation of the solvent or precipitation by dilution with excess water.

In the third step, the oxidizing agent used to convert the secondary alcohol group to the keto group may be any reactant suitable for this purpose, i.e., any mild oxidizing agent, such as an alkali metal dichromate or permanganate. However, the oxidizing agent of choice is chromium trioxide (chromic acid), used under acidic conditions. The reaction is conducted in an organic medium which is at least a partial solvent for the 5,6,6-trifluoro-3-hydroxy steroid. Thus, for example a glacial acetic acid solution can be treated with chromic acid, as such or dissolved in the same solvent. Preferably, a solution of the steroid in a water-miscible solvent such as acetone or dioxane is treated with a solution of chromic acid in dilute (e.g., 10–50%) aqueous sulfuric acid. This reaction is exothermic, and temperatures above about 50° C. are to be avoided to insure good control. Preferably, the external reaction temperature is in the range of 0 to 25° C. The chromic acid is used in at least stoichiometric amount or in slight to moderate excess, e.g., 10–50%. The reaction product can be isolated by any appropriate means, for example by diluting the reaction mixture with an excess of water. In this and the preceding step, other acyloxy substituents that may have been present in the initial α-fluoroketo steroid are also hydrolyzed, then converted to a keto group.

The last step of the process is a dehydrofluorination reaction whereby a double bond is created in the α,β-position relative to the keto group, i.e. between the 4- and 5-carbons. It is to be noted that the fluorine atoms in γ-position, i.e., on the 6-carbon are not affected, because of the much greater tendency of the atomic grouping involved to form the stable α,β-unsaturated keto structure than any other unsaturated configuration. The dehydrofluorinating agent may be any of those known and used in the art to dehydrohalogenate steroids. For example, hydrogen chloride in chloroform solution may be used for this purpose. Preferably, the dehydrofluorinating agent is a weak base, for example a tertiary amine such as pyridine or triethylamine, or an aqueous solution of an alkali metal salt of an organic carboxylic acid of dissociation constant lower than $9 \times 10^{-5}$, such as sodium acetate, sodium propionate or potassium benzoate. Such weak bases have been used previously in the dehydrohalogenation of steroids and their mode of application is well known. However, the preferred dehydrofluorinating agent is alumina. This material (which as is known, is amphoteric but predominantly basic in its reactions) is used in a procedure which is essentially a chromatographic treatment of the 5,6,6-trifluoro-3-keto steroid, conducted as already described in connection with the preparation of the starting materials. In this method, which has the advantage that it removes hydrogen fluoride and purifies the compound in one single operation under very mild conditions, the 5,6,6-trifluoro-3-keto steroid dissolved in a suitable solvent is adsorbed onto alumina at or near room temperature (15–25° C.) and the product is eluted with an appropriate solvent or combination of solvents, whereby the resulting 6,6-difluoro-3-keto-Δ⁴ steroid can be isolated in a satisfactory state of purity. For this purpose, any kind of alumina can be used. The preferred material is the so-called "neutral" alumina (a weak base) of activity II–V.

The invention is illustrated in greater detail in the following examples. In these examples the melting points are reported as observed using a Fisher-Johns apparatus unless otherwise noted and are uncorrected. The optical rotation determinations were made in chloroform (Chf), dioxane (Di) or pyridine (Py). The values given are followed by the letter c and a number which indicates the concentration (grams of substance per 100 ml. of solvent).

EXAMPLE 1

*6,6,17,17-tetrafluoro-4-androstene-3-one*

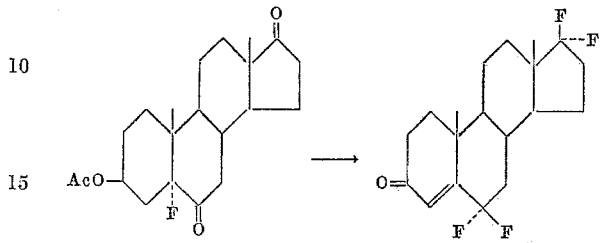

A. To a mixture of 3β-acetoxy-5α-fluoroandrostane-6,17-dione (4.0 g., 11.0 millimoles), water (3 ml.) and methylene chloride (80 ml.) in a corrosion-resistant bomb cooled in a Dry Ice-acetone bath was added 180 g. of sulfur tetrafluoride. The bomb was agitated for 16 hours at 22±2° C., after which it was vented and all volatile components were removed under reduced pressure. The dark reaction product was taken up in methylene chloride and the solution was chromatographed on neutral almina (activity III). Elution with petroleum ether and petroleum ether-benzene (9:1 and 1:1) gave 2.93 g. of 3β-acetoxy-5α,6,6,17,17-pentafluoroandrostane.

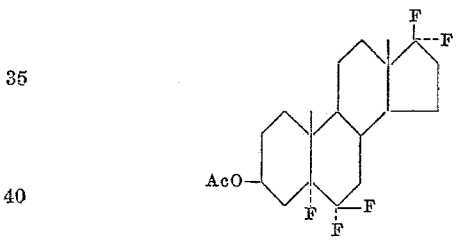

as a nearly colorless crystalline solid, M.P., 133–136° C. Recrystallization of the combined fractions from petroleum ether gave in two crops analytically pure material (2.4 g.), M.P. 135–138° C., $[\alpha]_D^{24°} -12°$ (c. 2.05 Chf)

*Analysis.*—Calc'd for $C_{21}H_{28}O_2F_5$: C, 61.8; H, 7.1; F, 23.1. Found: C, 61.79; H, 6.94; F, 23.18.

B. A solution of 3β-acetoxy-5α,6,6,17,17-pentafluoroandrostane (2.5 g.), concentrated hydrochloric acid (10 ml.) and methanol (100 ml.) was heated to reflux for 1 hour. To the hot solution was added enough water to make it slightly turbid, and a few seed crystals were added. On cooling, 3β-hydroxy-5α,6,6,17,17-pentafluoroandrostane crystallized as long white needles, M.P. 143–144° C., obtained in nearly quantitative yield.

*Anal.*—Calc'd for $C_{19}H_{26}OF_5$: C, 62.3; H, 7.37. Found: C, 62.07; H, 7.66.

C. To a stirred solution of 1.9 g. of the above stanol in 100 ml. of acetone cooled in ice was added dropwise a slight excess of chromic acid in dilute sulfuric acid. After about 10 minutes, the reaction mixture was poured in water and the precipitate was collected, washed well with cold, aqueous acetone and dried. There was obtained 1.8 g. of 5α,6,6,17,17-pentafluoroandrostane-3-one, M.P., 128–133° C. The infrared spectrum showed $$\lambda_{max.}^{CCl_4}\ 5.8\mu$$

D. The above stanone (1.5 g.) was dissolved in 50 ml. of benzene and the solution was adsorbed onto alumina (45 g., neutral, activity III). Elution with petroleum ether, containing increasing amounts of benzene, gave 1.31 g. of 6,6,17,17-tetrafluoro-4-androstene- 3-one as a white crystalline solid, M.P. 114–117° C., [α]$_D^{22°}$ −12° (c. 1.95 Chf).

Infrared: λ$_{max.}^{CCl_4}$ 5.95μ (conj. C=O). Ultraviolet: λ$_{max.}^{EtOH}$ 228 mμ (K=37).

Anal.—Calc'd for $C_{19}H_{24}OF_4$: C, 66.3; H, 6.97; F, 22.0. Found: C, 65.98; H, 7.14; F, 20.76.

The starting material in this example, 3β-acetoxy-5α-fluoroandrostane-6,17-dione, was prepared by the following reaction sequence:

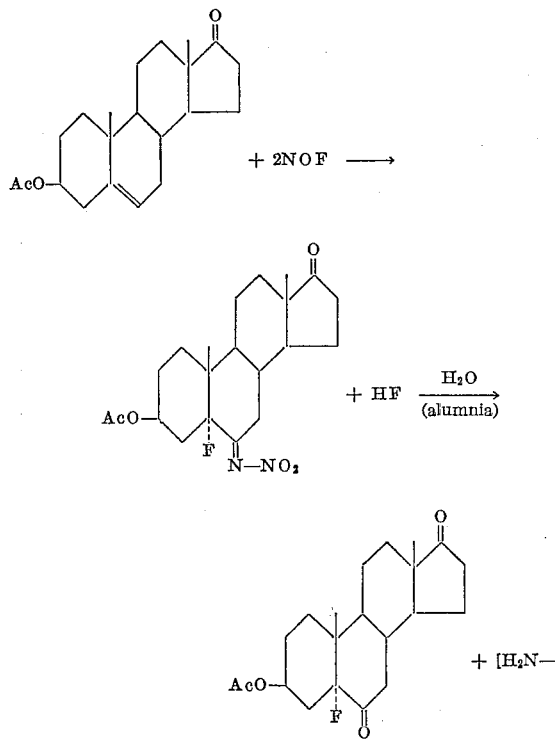

A slow stream of nitrosyl fluoride (7 g., 143 millimoles) was passed into a stirred solution of 3β-acetoxy-5(6)-androstene-17-one (10.0 g., 30 millimoles) in carbon tetrachloride (60 ml.) at 0° C. for 6 hours. The reaction product was poured into water and the phases were separated. The aqueous phase was extracted with additional carbon tetrachloride and the combined carbon tetrachloride solutions were washed with water, dried and evaporated under reduced pressure. This gave 3β-acetoxy-5α-fluoro-6-nitriminoandrostane-17-one as a nearly colorless glass.

Infrared: λ$_{max.}^{CCl_4}$ 5.78μ (C=O and acetate), 6.0μ

(C=$\overset{NO_2}{\overset{|}{C}}$ or C=N) (weak), 6.12μ (C=N), 6.40 and 7.65μ (—NO$_2$), 8.15μ (acetate) and 8.65μ (C—F).

Without further purification, the total crude product was dissolved in benzene (20 ml.) and adsorbed onto a column of neutral alumina (300 g., activity III), prepared with petroleum ether. Elution with petroleum ether (12 100-ml. fractions) returned a gum (0.387 g.) which was discarded. Further elution with petroleum ether-benzene (1:1, 29 fractions of 100 ml.) returned 3β-acetoxy-5α-fluoroandrostane-6,17-dione (7.74 g., 70.8% yield) as a white crystalline solid, M.P. 184–187° C.

Recrystallizaion from petroleum ether-methylene chloride returned the fluorodione as long, white blades (6.7 g.), M.P. 187–189° C. An analytical sample was recrystallized twice from petroleum ether-acetone to give thick colorless hexagons, M.P. 189–189.5° C. (capillary tube) [α]$_D^{24°}$ +55° (c. 2.07 Chf).

Infrared: λ$_{max.}^{CCl_4}$ 5.78μ (C=O and acetate), 8.15μ (acetate and 8.65μ (C—F).

Anal.—Calc'd for $C_{21}H_{29}O_4F$: C, 69.2; H, 7.96; F, 5.22. Found: C, 69.58; H, 8.04; F, 5.15.

The more polar fractions (0.971 g.) eluted with ether and methanol were partially crystalline and on the basis of their infrared spectra appeared to be the stanol resulting from hydrolysis of the acetate group on the column.

EXAMPLE 2

*6,6,20,20-tetrafluoro-4-pregnene-3-one*

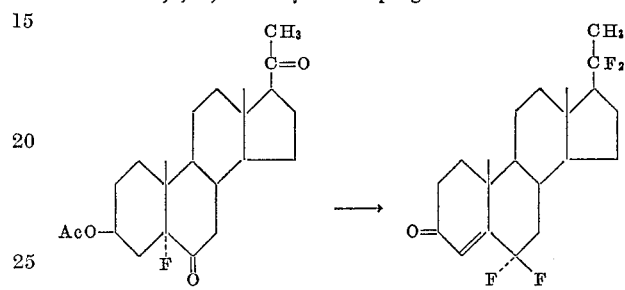

A. A solution of 3β-acetoxy-5α-fluoropregnane-6,20-dione (3.6 g., 9.34 millimoles), water (3 ml.), methylene chloride (80 ml.) and sulfur tetrafluoride (150 g.) was agitated in a bomb at 22±3° C. for 16 hours. The reaction product was isolated with methylene chloride and the solution was evaporated to dryness under reduced pressure to give a dark residue (3.96 g.). The infrared spectrum of the product showed that some C–20 ketone remained, indicating that the reaction had not completely proceeded to fluorination of both keto groups. The total crude product was dissolved in a small amount of benzene and the solution was adsorbed onto a column of neutral alumina (120 g., activity III) prepared with petroleum ether. Elution with petroleum ether (two 80-ml. fractions) first gave about 0.1 g. of sulfur. Continued elution with the same solvent (twenty 80-ml. fractions) returned a white crystalline material (1.57 g.). These fractions were combined and crystallized from hexane to give 1.16 g. of 3β-acetoxy-5α,6,6,20,20-pentafluoropregnane

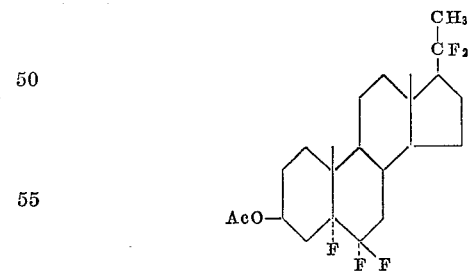

as long, white, prismatic needles, M.P. 130–133° C., [α]$_D^{24°}$ 0° (c. 2.14 Chf).

Infrared: λ$_{max.}^{CCl_4}$ 5.78μ (acetate), 8.0μ (acetate), 8.2, 8.3, 8.45, 8.55, and 8.75μ (C—F).

Anal.—Calc'd for $C_{23}H_{33}O_2F_5$: C, 63.3; H, 7.57; F, 21.78. Found: C, 63.03; H, 7.45; F, 20.72.

Continued elution with petroleum ether-benzene (1:1), then with benzene returned a mixture (1.88 g.) of unchanged starting material and partially fluorinated product.

B. A solution of 3β-acetoxy-5α,6,6,20,20-pentafluoropregnane (0.78 g.), concentrated hydrochloric acid (5 ml.) and methanol (50 ml.) was heated to reflux for one hour. Sufficient water was added to cause the solution to become turbid. As the solution cooled, the hydrolysis product crystallized as white, cotton-like needles. Crystallization from hexane returned 0.6 g. of 3β-hydroxy-5α,6,6,20,20-pentafluoropregnane as white needles, M.P. 132–133° C., $[\alpha]_D^{24°}$ 0° (c. 1.31 Chf).

Infrared: $\lambda_{max.}^{CCl_4}$ 2.9μ (—OH)

*Anal.*—Calc'd for $C_{21}H_{31}OF_5$: C, 63.95; H, 7.86; F, 24.1. Found: C, 63.6; H, 8.13; F, 23.37.

C. To a stirred solution of the above pentafluorostanol (0.5 g.) in acetone (25 ml.) cooled in ice was added an excess of chromic acid dissolved in dilute sulfuric acid. The red solution was stirred for 15 minutes, then poured in water. The precipitate was extracted with ether and obtained as a white crystalline solid (0.483 g.) melting at 134–137° C. Recrystallization from hexane gave 5α,6,6,20,20-pentafluoropregnane-3-one as large, jagged, white crystals, M.P. 138–141° C.

Infrared: $\lambda_{max.}^{CCl_4}$ 5.80μ (C=O)

*Anal.*—Calc'd for $C_{21}H_{29}OF_5$: C, 64.3; H, 7.4; F, 24.1. Found: C, 64.42; H, 7.72; F, 23.22.

D. A 0.46 g. portion of the above pentafluorostanone was dissolved in a small volume of petroleum ether-benzene (1:1) and the solution was adsorbed onto a column of neutral alumina (40 g., activity III). Elution with benzene gave first a small amount (28 mg.) of an oil which was shown by its infrared spectrum to be a mixture of the unchanged pentafluorostanone and its dehydrofluorination product. Continued elution with benzene returned a clear, colorless oil (0.433 g.) which spontaneously solidified, M.P. 90–93° C. This, on recrystallization from hexane, gave 0.382 g. of 6,6,20,20-tetrafluoro-4-pregnene-3-one as thick, colorless needles, M.P. 94–96° C. $[\alpha]_D^{24°}$ 0° (c. 1.85 Chf).

Infrared: $\lambda_{max.}^{CCl_4}$ 5.93μ (conj. C=O). Ultraviolet: $\lambda_{max.}^{EtOH}$ 228mμ (K=32.3)

*Anal.*—Calc'd for $C_{21}H_{28}OF_4$: C, 67.8; H, 7.52; F, 20.3. Found: C, 67.92; H, 7.10; F, 19.49.

The starting material in this example, 3β-acetoxy-5α-fluoropregnane-6,20-dione, was prepared as follows:

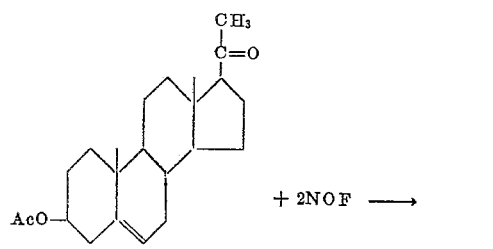

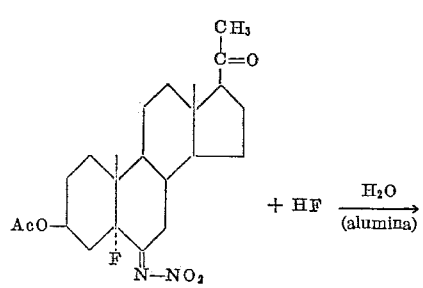

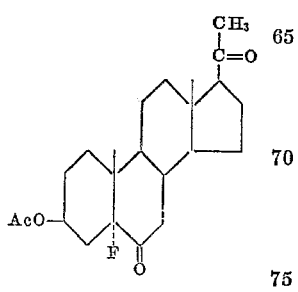

A slow stream of nitrosyl fluoride (6 g., 122 millimoles) was passed into a stirred solution of 3β-acetoxy-5(6)-pregnene-20-one (6.5 g., 18.5 millimoles) in carbon tetrachloride (100 ml.) at 0° C. over a 4-hour period. The reaction mixture was poured into water and extracted several times with carbon tetrachloride. The extracts were washed with water and saturated sodium chloride solution and dried over magnesium sulfate. The solvent was distilled under reduced pressure to yield the 3β-acetoxy-5α-fluoro-6-nitrimino-pregnane-20-one as a thick yellow syrup.

Infrared: $\lambda_{max.}^{CCl_4}$ 5.80μ (acetate), 5.88μ (C=O), 6.15μ (C=N), 6.40 and 7.65μ (—NO₂), 8.15μ (acetate) and 8.65μ (C—F)

Without further purification, the total crude reaction product was dissolved in benzene (ca. 20 ml.) and adsorbed onto a column of neutral alumina (180 g., activity III) which had been prepared with petroleum ether. Elution with petroleum ether (four 80-ml. fractions) gave a gummy material (0.048 g.) which was discarded. Further elution with petroleum ether-benzene (1:1) (nineteen 80-ml. fractions) afforded 3β-acetoxy-5α-fluoropregnane-6,20-dione (5.04 g., 71% yield) as a white, crystalline solid, M.P. 150° C.

Infrared: $\lambda_{max.}^{CCl_4}$ 5.75μ (partially resolved doublet due to C-6 C=O and acetate), 5.85μ (C-20 C=O), 8.15μ (acetate) and 8.65μ (C—F)

This product was recrystallized from methanol to give long white needles, M.P. 150–153° C. An analytical sample was recrystallized twice from methanol, M.P. 159–161° C., $[\alpha]_D^{24°}$ +42° (c. 1.65 Chf).

$\lambda_{max.}^{CCl_4}$ 5.78μ (C-6 C=O and acetate), 5.90μ (C-20 C=O), 8.10μ (acetate) and 8.65μ (C—)

*Anal.*—Calc'd for $C_{23}H_{33}O_4F$: C, 70.3; H, 8.42; F, 4.85. Found: C, 70.13; H, 8.65; F, 5.42.

EXAMPLE 3

*6,6-difluoro-4-pregnene-3,20-dione (6,6-difluoroprogesterone)*

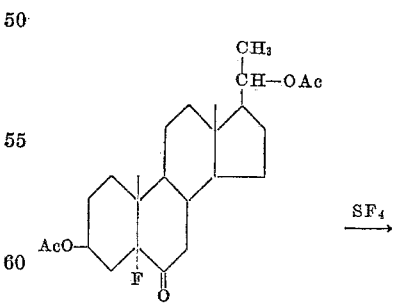

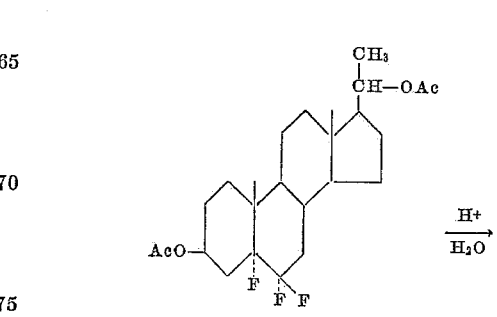

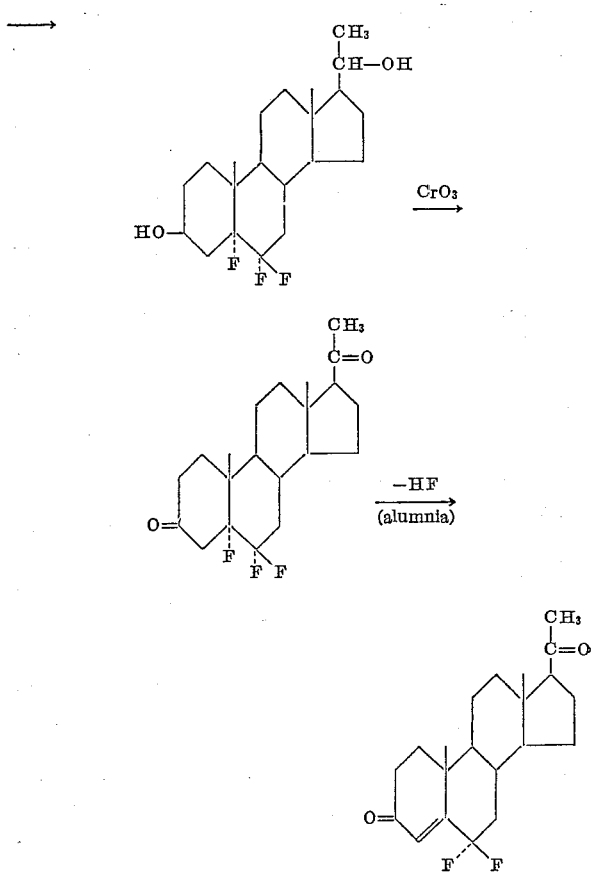

A. A solution of 3β,20β-diacetoxy-5α-fluoropregnane-6-one (3.0 g., 6.9 millimoles), water (0.5 ml.), sulfur tetrafluoride (80 g., 0.72 mole) and methylene chloride (80 ml.) was agitated in a bomb at 20° C. for 10 hours. The volatile materials were removed by evacuating at temperatures less than 20° C. and the reaction product was isolated with methylene chloride. The colorless solution was washed successively with water, 5% aqueous sodium bicarbonate, water and saturated sodium chloride solution. After drying over magnesium sulfate, the solvent was removed under reduced pressure, leaving a colorless syrup which spontaneously crystallized. Recrystallization of the total crude product from hexane afforded 2.14 g. of 3β,20β-diacetoxy-5α,6,6-trifluoropregnane, M.P. 157–160° C., $[\alpha]_D^{22°}$ +10° (C. 2.4 Di).

$\lambda_{max.}^{CCl_4}$ 5.75 and 8.1μ (acetate), 8.4, 8.6 and 8.75μ (C—F)

This compound was obtained as a crystalline hydrate whose water could not be readily removed.

*Anal.*—Calc'd for $C_{25}H_{37}O_4F_3 \cdot 2/3H_2O$: C, 64.0; H, 8.14; F, 12.00. Found: C, 63.90; H, 7.70; F, 11.84.

B. A solution of product (A) above (1.85 g., 4.04 millimoles), concentrated hydrochloric acid (70 ml.) and methanol (75 ml.) was heated to reflux for 2 hours. Sufficient water was added to cause turbidity and the reaction product was allowed to crystallize (1.79 g., M.P. 186–188° C.). The infrared spectrum showed that the hydrolysis was complete. A portion was recrystallized from acetone-hexane to yield pure 5α,6,6-trifluoropregnane-3β,20β-diol, M.P. 201–202° C., $[\alpha]_D^{22°}$ —20° (c. 3.72 Di).

Infrared: $\lambda_{max.}^{CCl_4}$ 3.0μ (—OH), 8.3, 8.4, 8.45, 8.65, 8.8μ (C—F and CF_2)

This product also contained water of crystallization.

*Anal.*—Calc'd for $C_{21}H_{33}O_2F_3 \cdot 2/3H_2O$: C, 65.3; H, 8.90; F, 14.4. Found: C, 65.33; H, 8.80; F, 13.10.

C. To a stirred solution of product (B) above (1.05 g., 2.8 millimoles) in acetone (50 ml.) at about 10° C. was added dropwise an excess of 8 N chromic acid in aqueous sulfuric acid. The mixture was stirred for an additional 15 minutes, after which the solution was decanted from the chromium salts and poured into water. The precipitated solid was collected by filtration, dissolved in methylene chloride and the resulting solution was dried over magnesium sulfate and evaporated. The aqueous filtrate was also extracted with methylene chloride. The extract was washed with water and saturated sodium chloride solution, dried and evaporated under reduced pressure, and the residue was combined with the product from the first methylene chloride solution (total, 0.86 g.). The infrared spectrum (Nujol mull) showed that complete oxidation had been achieved but that some dehydrofluorination had also taken place. The total crude 5α,6,6-trifluoropregnane-3,20-dione was taken on to the next step without further purification.

D. A solution of product (C) above (0.86 g.) in benzene (25 ml.) was adsorbed onto a column of neutral alumina (25 g., activity III). Elution with benzene (five 40-ml. fractions) returned 0.73 g. of 6,6-difluoroprogesterone (i.e., 6,6-difluoro-4-pregnane-3,20-dione) as colorless crystals, M.P. 135–138° C., showing strong infrared absorption in chloroform at 5.90μ (C–3 and C–20 C=O). This material was recrystallized from hexane, then from hexane-methylene chloride, to give analytically pure 6,6-difluoroprogesterone as white needles, M.P. 134–135° C. $[\alpha]_D^{22°}$ +48° (c. 1.67 Di). The ultraviolet spectrum showed $\lambda_{max.}^{EtOH}$ at 228 mμ ($\epsilon$=12,200)

*Anal.*—Calc'd for $C_{21}H_{28}O_2F_2$: C, 72.1; H, 7.99; F, 10.8. Found: C, 71.82; H, 7.86; F, 10.43.

The mother liquors were concentrated and formed on standing an additional amount of the same product. Like progesterone, 6,6-difluoroprogesterone exists in two crystalline modifications. Slow crystallization results in large, colorless rhomboid-like crystals, M.P. 145–148° C., while rapid crystallization affords needles melting at 134–135° C.

The α-fluoroketo steroid used as the starting material in this example was prepared by the method already described in detail in Examples 1 and 2, i.e., reaction of nitrosyl fluoride with 3β,20β-diacetoxy-5(6)-pregnene to give 3β,20β - diacetoxy - 5α - fluoro - 6-nitriminopregnane (M.P. 165–168° C.), followed by hydrolysis of the latter over neutral alumina of activity III and elution with a suitable solvent, in this case 2:1 petroleum ether-benzene. The resulting 3β,20β-diacetoxy-5α-fluoropregnane-3-one melts at 155–158° C. after recrystallization from methylene chloride-petroleum ether and further recrystallization from hexane.

*Anal.*—Calc'd for $C_{25}H_{37}O_5F$: C. 68.8; H. 8.48; F, 4.37. Found: C, 69.09; H, 8.70; F, 4.60.

EXAMPLE 4

*6,6-difluoro-4-androstene-3,17-dione*

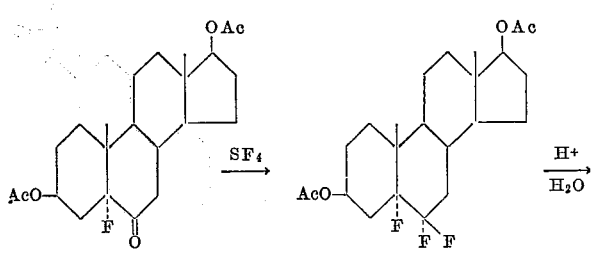

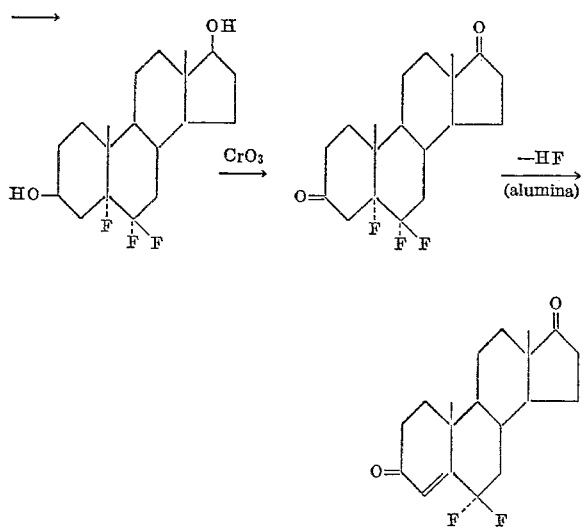

A. A solution of 3β,17β-diacetoxy-5α-fluoroandrostane-6-one (3.0 g., 7.35 millimoles), water (1.5 ml.), methylene chloride (80 ml.) and sulfur tetrafluoride (90 g., 0.78 mole) was agitated in a bomb at 22±2° C. for 15 hours. The reaction product (3.07 g.) was isolated by the procedure of Example 3–A. It was recrystallized from hexane to give, in two crops, 2.47 g. of 3β,17β-diacetoxy-5α,6,6-trifluoroandrostane, M.P. 162° C., [α]$_D^{24°}$ —10° (c. 2.04 Di).

Infrared: $\lambda_{max}^{CCl_4}$ 5.75 and 8.15μ (acetate), 8.45, 8.6 and 8.75μ (C—F, sharp, medium bands)

The F$^{19}$n-m-r spectrum at 56.4 mc./s. showed a signal for —CF$_2$ at 2190 c.p.s. and a signal for C—F as a doublet at 5635 and 5680 c.p.s. from Freon 112 (external).

Anal.—Calc'd for C$_{23}$H$_{33}$O$_4$F$_3$: C, 64.3; H, 7.67; F, 13.2. Found: C, 64.17; H, 8.74; F, 13.11.

B. A solution of product (A) above (2.01 g., 4.67 millimoles), concentrated hydrochloric acid (10 ml.) and methanol (100 ml.) was heated to reflux for 1 hour. The reaction mixture was diluted with water until just turbid and allowed to cool slowly. The product crystallized as the solution cooled and was collected by filtration, washed well with water and dried. There was obtained 1.74 g. of 5α,6,6-trifluoroandrostane-3β,17β-diol which, after recrystallization from acetone-hexane, was obtained as thick, colorless blades, M.P. 155–156° C., [α]$_D^{24°}$ —15° (c. 2.06 Di).

Anal.—Calcd. for C$_{19}$H$_{29}$O$_2$F$_3$: C, 66.0; H, 8.38; F, 16.4. Found: C, 65.53; H, 8.87; F, 16.01.

C. To a stirred solution of product (B) above (2.0 g., 5.78 millimoles) in acetone (50 ml.) cooled in an ice bath was added dropwise an excess of 8 N chromic acid in aqueous sulfuric acid. The reaction mixture was stirred for 15 minutes at ice temperature and then for 5 minutes at room temperature. The product was isolated by the procedure of Example 3–C. There was thus obtained 1.7 g. of 5α,6,6-trifluoroandrostane-3,17-dione, M.P. 210–215° C. after recrystallization from acetone-hexane, [α]$_D^{24°}$ +57° (c. 1.23 Di). This product was contaminated with a minor amount of incompletely oxidized diol (see below).

Infrared: $\lambda_{max}^{Nujol}$ 5.8μ (C–3 and C–17 C=O), 8.4, 8.65, 8.75 and 8.9μ (C—F and CF$_2$)

Anal.—Calc'd for C$_{19}$H$_{25}$O$_2$F$_3$: C, 66.7; H, 7.3. Found: C, 65.97; H, 7.46.

D. A solution of product (C) above (1.35 g., 3.95 millimoles) in benzene (25 ml.) was adsorbed onto a column of neutral alumina (45 g., activity III) which had been prepared with petroleum ether. Elution with 1:1 petroleum ether-benzene returned a small amount of gummy material which was not further investigated. Further elution with benzene (five 80-ml. fractions) and evaporation of the combined fractions gave a white crystalline residue (0.75 g.) of 6,6-difluoro-4-androstene-3,17-dione, M.P. 195° C. After recrystallization from acetone-hexane, this product was obtained as clear, colorless cubes which melted at 188° C. then resolidified and melted at 200° C.

Infrared: $\lambda_{max}^{KBr}$ 5.75μ (C–17 C=O), 5.90μ (C–3 C=O), 8.15, 8.21, 8.33, 8.44, 8.48, 8.65, 8.78, 8.87μ (C–F).
Ultraviolet: $\lambda_{max}^{EtOH}$ 227 mμ (ε=13,120)

Anal.—Calc'd for C$_{19}$H$_{24}$O$_2$F$_2$: C, 70.8; H, 7.46. Found: C, 70.78; H, 7.52.

Continued elution with benzene-methylene chloride (four 80-ml. fractions) returned a crystalline material (0.49 g.) whose infrared spectrum showed it to be a mixture of 6,6-difluoro-4-androstene-3,17-dione and partially oxidized 5α,6,6-trifluoroandrostane-3β,17β-diol. This material (0.49 g.) and additional diol (0.21 g.) recovered from mother liquors was reoxidized with chromic acid as described in (C) above to give 0.67 g. of oxidation product, which in turn was chromatographed on alumina (30 g., activity III) as above. Elution with benzene (four 80-ml. fractions) and recrystallization of the combined eluates from methylene chloride-hexane gave 0.58 g. of 6,6-difluoro-4-androstene-3,17-dione as massive, jagged, white crystals, M.P. 200° C. The infrared spectrum of this material was identical to that of the product previously obtained. The mother liquors of this crystallization were combined with those from the first preparation and yielded on concentration an additional 0.23 g. of 6,6-difluoro-4-androstene-3,17-dione.

The α-fluoroketo steroid used as the starting material in this example was prepared by the previously described method, i.e., reaction of nitrosyl fluoride with 3β,17β-diacetoxy-5-androstene to give 3β,17β-diacetoxy-5α-fluoro-6-nitriminoandrostane, followed (without purification) by hydrolysis over neutral alumina (activity III). Elution with 1:1 petroleum ether-benzene, then with benzene, afforded 3β,17β - diacetoxy - 5α - fluoroandrostane-6-one, M.P. 160–162° C. after recrystallization from hexane, then from methanol.

Anal.—Calc'd for C$_{23}$H$_{33}$O$_5$F: C, 67.84; H, 8.09. Found: C, 67.13; H, 8.25.

EXAMPLE 5

*6,6-difluoro-4-androstene-3-one-17β-ol (6,6-difluorotestosterone)*

This α,β-unsaturated-γ,γ-difluoroketo steroid was prepared from the 6,6-difluoro-4-androstene-3,17-dione of Example 4 by reduction of the keto groups to hydroxyl groups with sodium borohydride, followed by selective oxidation of the 3-hydroxyl to a keto group, using 2,3-dichloro-5,6-dicyanobenzoquinone as the selective oxidizing agent [the use of this reagent for similar conversions has been described by Burn, Petrow and Weston in Tetrahedron Letters 9, 14 (1960)]. This reaction sequence is represented by the equations:

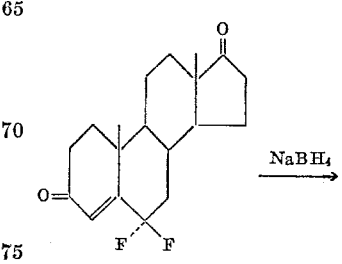

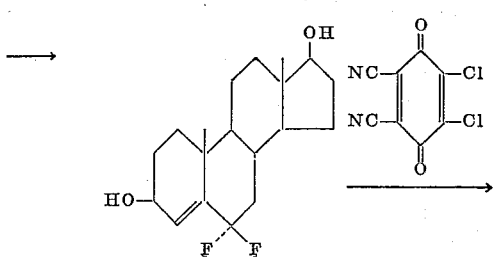

A. To a stirred solution of 6,6-difluoro-4-androstene-3,17-dione (0.99 g., 3.06 millimoles) in isopropanol (60 ml.) was added a solution of sodium borohydride (ca. 12 milliequivalents) in isopropanol (50 ml.). The reaction mixture was stirred for 20 hours at room temperature, after which it was acidified with dilute hydrochloric acid. The mixture was then diluted with water and the reaction product was extracted with ether and isolated as a white crystalline solid (0.95 g.). The infrared spectrum showed that complete reduction of both C–3 and C–17 keto groups had been achieved. The 6,6-difluoro-4-androstene-3β,17β-diol so obtained was carried on to the next step without further purification.

B. A solution of product (A) above (0.95 g., 2.91 millimoles), 2,3-dichloro-5,6-dicyanobenzoquinone (0.8 g., 3.56 millimoles) in benzene (60 ml.) and dioxane (25 ml.) was stirred for 20 hours at room temperature. During this period, the corresponding hydroquinone precipitated. The reaction mixture was diluted with ether, poured into water with stirring, and the phases were separated. The organic phase was successively washed with water, 5% aqueous sodium bicarbonate, water and saturated sodium chloride solution. After drying over magnesium sulfate, the solvents were evaporated under reduced pressure, leaving a tan oil which crystallized when triturated with ether. The infrared spectrum showed a strong hydroxyl band at 2.95μ and a strong conjugated carbonyl band at 5.90μ. No C–17 ketone band (5.78μ) was present. However, the intensity of the hydroxyl absorption suggested that only partial conversion had been achieved.

The total reaction product was dissolved in benzene and adsorbed onto a column of neutral alumina (40 g., activity III). Elution with first petroleum ether, then petroleum ether-benzene (1:1) returned a small amount of gummy material which was discarded. Further elution with benzene (four 50-ml. fractions) returned 0.282 g. of a material which formed long colorless blades from ether. The infrared spectrum ($\lambda_{max}^{Nujol}$ 2.9, 5.92, 8.6, 8.7 and 9.0μ)

showed that this product was 6,6-difluorotestosterone, Recrystallization (rapid) from ether-hexane of the combined fractions gave this product as thick colorless rods, M.P. 130° C. Recrystallization (slow) from hexane-ether gave thick, jagged blades, M.P. 133–134° C., $[\alpha]_D^{22°}$ −5° (c. 2.02 Di). The ultraviolet spectrum in ethanol showed $\lambda_{max}$. at 229 mμ (ε=12,100).

*Anal.*—Calc'd for $C_{19}H_{26}O_2F_2$: C, 70.3; H, 8.07; F, 11.6. Found: C, 69.87; H, 8.25; F, 11.4.

6,6-difluorotestosterone is dimorphic, existing in a needle form, M.P. 123–124° C. (rapid crystallization) and a prism form, M.P. 133–134° C. (slow crystallization). Such behavior is characteristic of many steroids having and α,β-unsaturated keto group in ring A.

Continued elution of the alumina with benzene and ether (eight 50-ml. fractions) returned a crystalline material (0.5 g.) whose infrared spectrum showed it to be mainly unreacted 6,6-difluoro-4-androstene-3β, 17β-diol containing some 6,6-difluorotestosterone. Repeated oxidation of this material by the described procedure afforded additional amounts of 6,6-difluorotestosterone.

EXAMPLE 6

*17α-ethynyl-6,6-difluoro-4-androstene-3-one-17β-ol*
*(6,6-difluoroethisterone)*

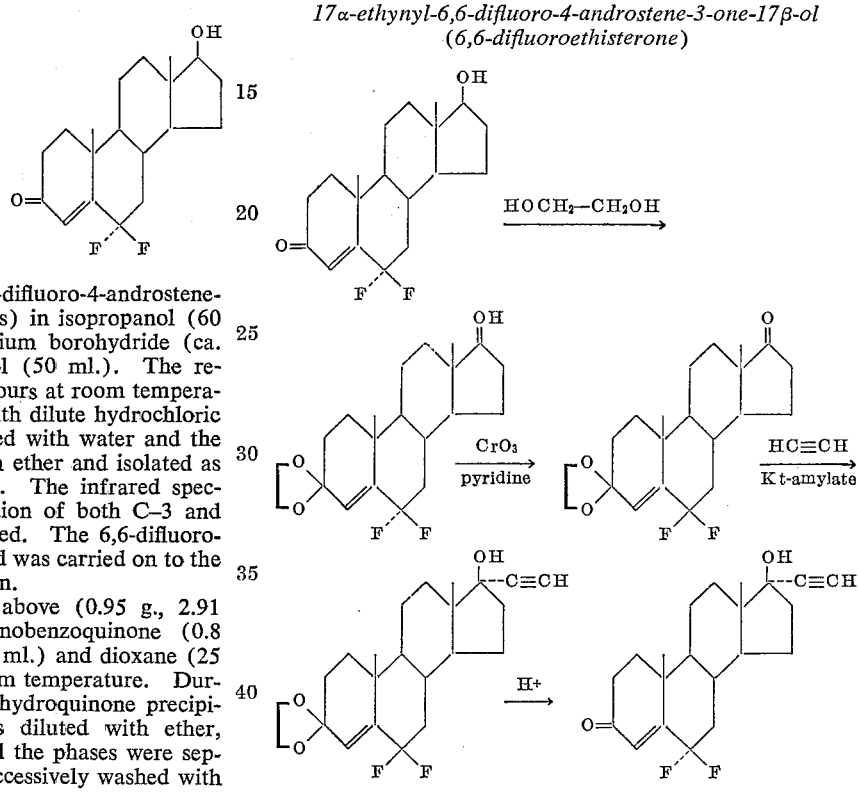

A. A solution of 6,6-difluorotestosterone (4.8 g., 14.8 millimoles), ethylene glycol (25 ml.) and p-toluenesulfonic acid (1 g.) in benzene (100 ml.) was heated to reflux for 24 hours. At the end of this period the reaction mixture separated into two phases, the bottom one of which was dark purple in color. This reaction mixture was shaken with 5% aqueous sodium bicarbonate, which caused the mixture to turn red. The benzene layer was separated, washed with saturated sodium chloride solution and dried over anhydrous magnesium sulfate, during which time the solution again turned purple.

A blue precipitate was removed along with the drying agent by filtering. The filtrate was evaporated under reduced pressure to leave a syrup whose infrared spectrum indicated a good conversion to 3-ethylenedioxy-6,6-difluoro-4-androstene-17β-ol, since the C–3 carbonyl band (5.95μ) was of greatly reduced intensity.

The crude amorphous product was carried on to the next step without further purification.

B. The reaction product from (A) was dissolved in dry pyridine (50 ml.) and the resulting solution was cooled in ice while chromium trioxide (3.1 g.) was added in small portions with stirring. A solid separated immediately and the mixture changed from a thick, red-brown slush to a thin dark brown slurry. After stirring overnight, the reaction mixture was diluted with ethyl acetate and then filtered through diatomaceous earth to give a clear yellow filtrate. This was washed with saturated sodium chloride solution, dried over magnesium sulfate and evaporated under reduced pressure to leave a partially crystalline solid. The infrared spectrum showed a strong band at 5.78μ, and no bands characteristic of a hydroxyl function, indicating that oxidation of the C-17 hydroxyl to a keto group had been achieved. A weak band at 5.9μ indicated the presence of a small amount of C-3 ketone. The crude product was carried on to the next step without further purification.

C. The reaction product from (B) was dissolved in dry toluene (100 ml.). To this solution was added a solution of potassium metal (4.5 g.) in t-amyl alcohol (45 ml.). The resulting dark mixture was stirred while a slow stream of acetylene was passed through it over a 20-hour period at room temperature. At the end of this period the reaction mixture was diluted with water, followed by sufficient concentrated hydrochloric acid to make the mixture turn a light yellow. It was then diluted with benzene (about 150 ml.) and washed with water and 5% hydrochloric acid. The organic layer was then mixed with 5% hydrochloric acid (50 ml.) and subjected to steam distillation to hydrolyze the ketal group and to remove the t-amyl alcohol and toluene. The residue from this distillation was separated from the remaining water and dissolved in methylene chloride. The solution was washed with saturated sodium chloride solution, dried over magnesium sulfate and evaporated under reduced pressure. The residual resin was chromatographed on neutral alumina (150 g., activity III). Elution with benzene (12 eighty ml. cuts) afforded a crystalline material (1.54 g.). The infrared spectrum of the product of the first two cuts (0.476 g.) indicated incomplete ethynylation. These cuts were excluded from the bulk of the reaction product. Infrared examination of the succeeding fractions showed that the desired product had been obtained. These fractions were combined and recrystallized twice from methylene chloride. The head crop of 6,6-difluoroethisterone consisted of 0.660 g. of colorless prisms, M.P. 219–220° C., $[\alpha]_D^{22°}$ −56° (Py). The mother liquors gave an additional 0.097 g. of product.

*Anal.*—Calc'd for $C_{21}H_{26}O_2F_2$: C, 72.3; H, 7.5. Found: C, 72.49; H, 7.70.

Ultraviolet: $\lambda_{max.}^{EtOH}$ 229 mμ (ε=12,350) and 332 mμ (ε=35)
Infrared: $\lambda_{max.}^{Nujol}$ 2.92μ (—OH), 3.06μ (≡CH), 4.75μ (—C≡C—) and 5.95μ (C–3 C=O)

EXAMPLE 7

*17α-acetoxy-6,6-difluoro-4-pregnene-3,20-dione*
*(17α-acetoxy-6,6-difluoroprogesterone)*

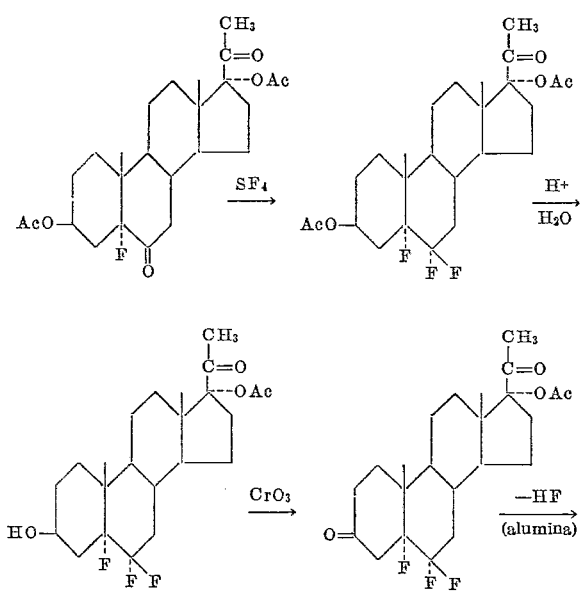

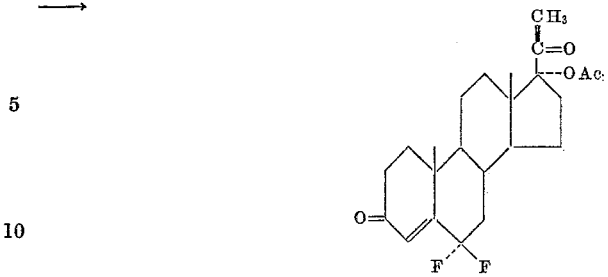

A. A solution of 3β,17α-diacetoxy-5α-fluoropregnane-6,20-dione (3.0 g., 6.6 millimoles), water (0.5 ml.), sulfur tetrafluoride (80 g., 0.72 mole) and methylene chloride (40 ml.) was agitated in a bomb at 20° C. for 10 hours. The reaction product, isolated as in Example 3–A, was a dark solid which was chromatographed on neutral alumina (90 g., activity III). Elution with petroleum ether returned a small amount (155 mg.) of a crystalline material which, on the basis of its infrared spectrum, was 3β, 17α-diacetoxy-5α,6,6,20,20-pentafluoropregnane. Further elution with petroleum ether-benzene (1:3) returned a colored, well crystallized material (2.67 g.). A portion (2.3 g.) of this product was recrystallized from acetone-hexane to give well formed thick blades, M.P. 245° C. An analytical sample was recrystallized from methanol to give thick blades, M.P. 245° C., of 3β,17α-diacetoxy-5α,6,6-trifluoropregnane-20-one.

*Anal.*—Calc'd for $C_{25}H_{35}O_5F_3$: C, 63.6; H, 7.46; F, 12.1. Found: C, 62.92; H, 7.53; F, 11.48.

Infrared: $\lambda_{max.}^{CCl_4}$ 5.75μ (acetates), 5.80μ (C–20 C=O), 8.0μ (acetates) and 8.7 and 8.95μ (C–F)

B. A solution of the above product (0.68 g.) in concentrated hydrochloric acid (1.5 ml.) and methanol (30 ml.) was heated to reflux for one hour and then allowed to stand at room temperature for an additional hour. Water was added to precipitate the product, which was collected by filtration, washed with water and air-dried to yield 0.48 g. of 17α-acetoxy-5α,6,6-trifluoropregnane-3β-ol-20-one, M.P. 220° C. One recrystallization from methanol afforded the product as tan-colored plates, M.P. 226–228° C.

*Anal.*—Calc'd for $C_{23}H_{33}O_4F_3$: C, 64.2; H, 7.72; F, 13.2. Found: C, 64.11; H, 7.59; F, 12.75.

Infrared: $\lambda_{max.}^{Nujol}$ 2.85 and 2.9μ (—OH), 5.82μ (C–20 C=O and C–17 acetate), 7.95μ (acetate) and 8.5, 8.72 and 9.0μ (C–F)

C. To a stirred solution of the above product (0.150 g.) in acetone (10 ml.) cooled in ice was added dropwise an excess of 8 N chromium trioxide in acetone. After stirring the reaction mixture for about 15 minutes, methanol was added to destroy the excess oxidizing agent. The mixture was then filtered to remove salts, and the filtrate was diluted with water. The reaction product separated as well crystallized plates (0.190 g.), M.P. 225–250° C., of 17α-acetoxy-5α,6,6-trifluoropregnane-3,20-dione. The infrared spectrum (Nujol mull) showed absorptions at 5.78μ (acetate), 5.82μ (shoulder, C–3 C=O), 5.85μ (C–20 C=O), 8.0μ (acetate) and 8.75 and 9.0μ (C–F).

D. The total product from (C) was dissolved in benzene (20 ml.) and this solution was passed through a column of neutral alumina (10 g., activity III). Elution with benzene (4 thirty ml. cuts) afforded 0.176 g. of crystalline 17α-acetoxy-6,6-difluoroprogesterone. A center cut melted at 216–217° C., $[\alpha]_D^{23}$ −26° (c. 2.33 Di).

*Anal.*—Calc'd for $C_{23}H_{30}O_4F_2$: C, 67.5; H, 7.38; F, 9.28. Found: C, 67.52; H, 7.40; F, 9.12.

Ultraviolet: $\lambda_{max.}^{EtOH}$ 229 mμ (ε=12,000)

Infrared: $\lambda_{max.}^{Nujol}$ 5.78 and 7.95μ (acetate), 5.85μ (C–20 C=O), 5.95μ (C–3 conj. C=O), 6.0μ (shoulder, C=C), 8.5, 8.65, 8.8 and 8.95μ (C–F)

The α-fluoroketo steroid used as the starting material in this example was prepared as follows: A solution of 3β,17α-diacetoxy-5-pregnene-20-one (8.2 g.) in carbon tetrachloride (100 ml.) was treated with a slow stream of nitrosyl fluoride (4 g.) at about 0° C. for a period of 3 hours. The reaction product was isolated essentially as described in Example 2. A portion (1 g.) of the crude crystalline solid was recrystallized from a methylene chloride-hexane mixture to give 3β,17α-diacetoxy-5α-fluoro-6-nitriminopregnane-20-one as thick, colorless rods, M.P. 185–188° C., [α]$_D^{22}$ —97° (c. 2.06 Di).

*Anal.*—Calcd for $C_{25}H_{35}FN_2O_7$: C, 60.7; H, 7.12; F, 3.84; N, 5.65. Found: C, 60.34; H, 7.14; F, 3.64; N, 5.57.

The remainder of the crude fluoronitrimine was dissolved in benzene (30 ml.) and the solution was absorbed onto a column of neutral alumina (200 g., activity III). Elution with petroleum ether-benzene, then with benzene, gave a crystalline material whose infrared spectrum showed complete hydrolysis of the nitrimine function. The crystalline fractions were combined and recrystallized from a methylene chloride-hexane mixture to give 3β,17α-diacetoxy-5α-fluoropregnane-6,20-dione (5.6 g.) as thick needles, M.P. 270° C. After a second crystallization from the same solvent mixture, the product melted at 274–276° C., [α]$_D^{22}$ —32° (c. 2.14 Di).

*Anal.*—Calc'd for $C_{25}H_{35}FO_6$: C, 66.5; H, 7.82; F, 4.21. Found: C, 65.99; H, 7.91; F, 3.79.

EXAMPLE 8

*6,6,17,17-tetrafluoro-1,4-androstadiene-3-one*

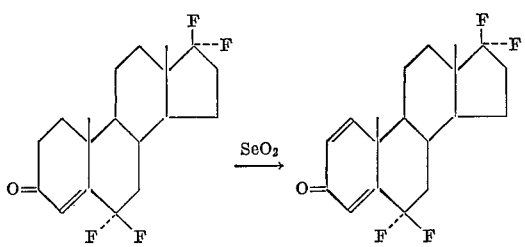

A mixture of 6,6,17,17-tetrafluoro-4-androstene-3-one (0.50 g.), selenium dioxide (0.20 g.), t-butyl alcohol (10 ml.) and acetic acid (2 ml.) was heated to reflux for 4 hours, then stirred overnight at room temperature. The reaction mixture was filtered to remove the selenium metal which had precipitated and the filtrate was diluted with water and extracted with chloroform. The chloroform extracts were washed with cold aqueous 5% sodium hydroxide, then with water and saturated aqueous sodium chloride, then dried over magnesium sulfate. Evaporation of the solvents under reduced pressure left a resin which was redissolved in methanol and treated with activated charcoal. The methanol filtrate from this operation was evaporated, the residue was redissolved in a little benzene and this solution was chromatographed on neutral alumina (30 g., activity III). Elution with 1:1 petroleum ether-benzene (5 fifty ml. portions) returned 0.627 g. of a partially crystalline material still contaminated with selenium. This product was recrystallized from hexane to give 6,6,17,17-tetrafluoro-1,4-androstadiene-3-one as white needles, M.P. 107–108° C., whose identity was established by its infrared and ultraviolet spectra.

Infrared: $\lambda_{max}^{Nujol}$ 5.98μ (C–3 C=O), 6.1μ (C=C), 8.55, 8.7 and 8.8μ (>CF$_2$)

Ultraviolet: $\lambda_{max}^{EtOH}$ 238mμ (ε=14,000)

The foregoing examples are to be considered as illustrative rather than limitative, since the described process is broadly applicable to any 3-acyloxy-5-fluoro-6-keto steroid to give a 6,6-difluoro-3-keto-Δ⁴ steroid.

Other specific examples of 6,6 - difluoro - 3 - keto - Δ⁴ steroids of this invention are set forth below. They can be prepared according to the described procedure, as set forth, e.g., in Example 1, without added transformation, in which case they are listed below by name opposite the formula of the starting 3-acyloxy-5-fluoro-6-keto steroid (the acyloxy group is shown only as RCOO— since it is eliminated during the process and its nature is immaterial); or by performing appropriate additional transformations on either the starting material or, more often, on the resulting 6,6-difluoro-3-keto-Δ⁴ steroid, in which case the final products are listed by names under "Derived Products." Such transformations, some of which have been illustrated in the preceding examples, include, among others, esterification, reduction, ethynylation, vinylation, dehydrogenation and the like. One such reaction which may be mentioned in particular is selective double bond formation between the 1- and 2-carbon atoms by subjecting a 6,6-difluoro-3-keto-Δ⁴ steroid to selenium dioxide oxidation or microbiological oxidation.

| Starting Material | Reaction Product |
|---|---|
| (steroid with OH, CH₃, RCOO–, F, O) | 6,6-difluoro-17β-hydroxy-17α-methyl-4-estrene-3-one |
| (steroid with OH, CH₃, RCOO–, F, O) | 6,6-difluoro-17α-methyl 4-androstene-17β-ol-3-one |
| (steroid with CH₂F, C=O, RCOO–, F, O) | 6,6,21-trifluoro-4-pregene-3-20-dione |
| (steroid with CH₃, C=O, CH₃, RCOO–, F, O) | 6,6-difluoro-17α-methyl-4-pregnene-3,20-dione |

| Starting Material | Reaction Product |
|---|---|
| ![structure with CH3, C=O, ---OAc, RCOO, F, O] | 17α-acetoxy-6,6-difluoro-19-norprogesterone |

DERIVED PRODUCTS

From 6,6-difluorotestosterone

17α-ethynyl-17β-propionyloxy-6,6-difluoro-4-androstene-3-one
6,6-difluoro-17α-vinyl-4-androstene-3-one-17β-ol
6,6-difluoro-17α-methallyl-4-androstene-3-one-17β-ol
17α-ethynyl-6,6-difluoro-1,4-androstadiene-3-one-17β-ol
17β-acetoxy-17α-ethynyl-6,6-difluoro-1,4-androstadiene-3-one
17α-allyl-6,6-difluoro-1,4-androstadiene-3-one-17β-ol From 17α-acetoxy-6,6-difluoroprogesterone 17α-acetoxy-6,6-difluoro-1,4-pregnadiene-3,20-dione From 6,6,21-trifluoro-4-pregnene-3,20-dione 6,6,21-trifluoro-1,4-pregnadiene-3,20-dione The new fluoroketo steroids of this invention have markedly high biological activity (as discussed below) when used in animal bodies, particularly rats. This activity is in contradistinction to known steroids having the same atomic groupings but in different relationship, for example, 4,4-difluoro-3-keto-Δ$^5$ steroids are reported to be inactive (Nikanishi, Morgan and Jensen, Chem. & Ind. 1960, 1136).

The 6,6-difluoro-3-keto-Δ$^4$ steroids of this invention are characterized by the following combination of biological properties in tests performed on rats: very low androgenic activity (or even antiandrogenic activity, see next paragraph) good anabolic activity and marked anti-gonadotropic effect. It has long been a goal in steroid research to synthesize compounds in which androgenic and anabolic activities are separated, since anabolic agents are useful in the treatment of a variety of debilitating conditions, in slowing down the ageing process, etc. but their use has been limited because all of the anabolic agents available retain to a large degree androgenic activity which results in rather serious side effects.

Tests on castrate male rats indicated that 6,6,17,17-tetrafluoro-4-androstene-3-one had marked anti-androgenic activity, as shown by the fact that it was effective in blocking the hormonal effect of simultaneously administered testosterone propionate.

Not only do the steroids of this invention possess anabolic activity when used in rats while being nearly or completely devoid of androgenic activity, but, in addition, they are anti-gonadotropic agents, which makes them advantageous in uses where this effect is desired without the powerful primary actions (shown by all sex hormones) which cause serious side reactions.

For example, tests on rats indicate that 6,6-difluorotestosterone (the product of Example 5) had at most 6% of the androgenic activity of testosterone, but between 30 and 63% of its anabolic activity. Furthermore, it had a very definite action in retarding the growth of the testes of immature male rats (about 58% of the controls), indicating a potent anti-gonadotropic effect.

These results are all the more surprising in view of the fact that the related 6-monofluorotestosterones have about 50% of the androgenic activity of testosterone (H. J. Ringold, "Mechanism of Action of Steroid Hormones," Symposium Publications Division, Pargamon Press, New York, 1961, pp. 213–216). While some of these 6-monofluorotestosterones have anti-gonadotropic activity (N. Appelzweig, "Steroid Drugs," McGraw-Hill Book Co., Inc., New York, 1962, p. 379), they thus lack the separation of anti-gonadotropic and androgenic effects shown by 6,6-difluorotestosterone.

A particularly valuable product of this invention is 6,6-difluoroethisterone, which was found to act as a very effective progestational hormone by either the subcutaneous or the oral route in female rabbits. A 5 mg. dose in the rabbit given orally caused marked proliferation of uterine mucosa. In comparison with currently used progestational agents, which tend to cause masculinization and early maturation of the bones of the female embryo when administered to pregnant females, 6,6-difluoroethisterone has the advantage of being devoid of androgenic (masculinizing) activity. This product was also found to be an effective anti-ovulation substance in female rabbits. Doses of 4.8 mg. and 2.4 mg. per animal gave 100% inhibition by the subcutaneous route and very substantial inhibitions by the oral route.

As further examples of biological activity, tests on rabbits showed that 6,6-difluoroprogesterone completely inhibited ovulation at doses of either 5 mg. or 2.5 mg. per test animal. 17α-acetoxy-6,6-difluoroprogesterone gave nearly complete inhibition of ovulation in rabbits at 5 mg. per animal. This compound further showed maximum progestational response in female rabbits when administered by the subcutaneous route (4.8 mg. per animal).

As many apparently widely different embodiments of this invention may be made without departing from the spirit and scope, thereof, it is to be understood that this invention is not limited to the specific embodiments thereof except as defined in the appended claims.

The embodiments of the invention in which an exclusive property or privilege is claimed are defined as follows:

1. 6,6-difluoro-3-keto-Δ$^4$ steroids of the formula

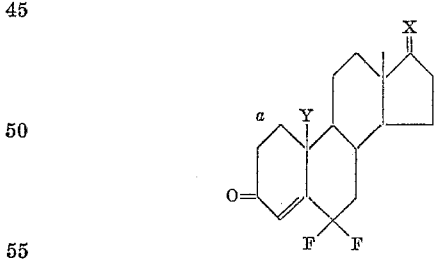

wherein Y is selected from the group consisting of —CH$_3$ and —H; $a$ is a single bond when Y is —H and $a$ is a bond of the class consisting of a single bond and a double bond when Y is —CH$_3$; and X is selected from the group consisting of

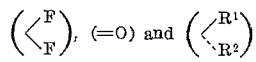

wherein R$^1$ is selected from the group consisting of —OH, —OCOCH$_3$, —OCOCH$_2$CH$_3$, —CF$_2$CH$_3$,

—COCH$_3$ and —COCH$_2$F, and R$^2$ is selected from the group consisting of —H, —OCOCH$_3$, —OCOCH$_2$CH$_3$, —CH$_3$, —C≡CH, —CH=CH$_2$, —CH$_2$—CH=CH$_2$, and

—CH$_2$C(CH$_3$)=CH$_2$ 2. 6,6-difluorotestosterone.
3. 6,6,17,17-tetrafluoro-4-androstene-3-one.
4. 6,6,20,20-tetrafluoro-4-pregnene-3-one.

5. 6,6-difluoro-4-pregnene-3,20-dione.
6. 6,6-difluoro-4-androstene-3,17-dione.
7. 6,6-difluoroethisterone.
8. 17β - acetoxy - 17a - ethynyl - 6,6 - difluoro - 1,4-androstadiene-3-one.
9. A process for preparing 6,6-difluoro-3-keto-Δ⁴ steroids which comprises treating a 3-acyloxy-5-fluoro-6-keto steroid with sulfur tetrafluoride at a mole ratio of at least 1:1 in an inert organic liquid medium, subjecting the resulting product to hydrolysis with a strong, non-oxidizing aqueous inorganic acid, oxidizing the hydrolysis product with a mild oxidizing agent comprising chromium trioxide under acidic conditions in an organic medium at a temperature of less than 50° C., and treating the oxidized product with a dehydrofluorinating agent comprising a weak base.
10. The process of claim 9 in which the treatment with said sulfur tetrafluoride is carried out at a temperature of from 15° to 75° C., in which the hydrolysis step is carried out at a temperature of from 15° to 125° C., and in which the oxidizing step is carried out at a temperature of from 0° to 25° C.
11. The process of claim 10 wherein the dehydrofluorinating agent is alumina.
12. A process for preparing 6,6-difluoroethisterone which comprises reacting 6,6-difluorotestosterone with ethylene glycol, treating the 3-ethylenedioxy-6,6-difluoro-4-androstene-17β-ol so formed with chromium trioxide, reacting the product so formed with acetylene in the presence of a potassium alcoholate, acidifying, and isolating the 6,6-difluoroethisterone by chromatographic means.

References Cited by the Applicant

Nakanishi, Morita and Jensen: J. Am. Chem. Soc., 81, 1136.

Nakanishi, Morita and Jensen: J. Am. Chem. Soc., 81, 5289 (1959).

Tadanier and Cole: J. Org. Chem. 26, 2436 (1961).

LEWIS GOTTS, *Primary Examiner.*

UNITED STATES PATENT OFFICE
CERTIFICATE OF CORRECTION

Patent No. 3,219,673                      November 23, 1965

George A. Boswell, Jr.

It is hereby certified that error appears in the above numbered patent requiring correction and that the said Letters Patent should read as corrected below.

Column 1, line 65 and column 2, line 1, before "is", each occurrence, insert -- steroid --; column 2, lines 65 to 72, for that portion of the formula reading $$\overset{\|}{N}\text{-NC}_2 \quad\quad \text{read} \quad\quad \overset{\|}{N}\text{-NO}_2$$

column 3, line 13, for "ar" read -- are --; line 19, for "substitutes" read -- substituents --; column 4, line 68, after "process," insert -- the --; column 7, line 29, for "(alumnia)" read -- (alumina) --; line 72, for "Recrystallizaion" read -- Recrystallization --; column 11, line 22, for "(alumnia)" read -- (alumina) --; column 12, line 24, for "-pregnane-" read -- -pregnene- --; column 16, line 2, for "and" read -- an --; column 20, lines 30 to 40, the formula should appear as shown below instead of as in the patent:

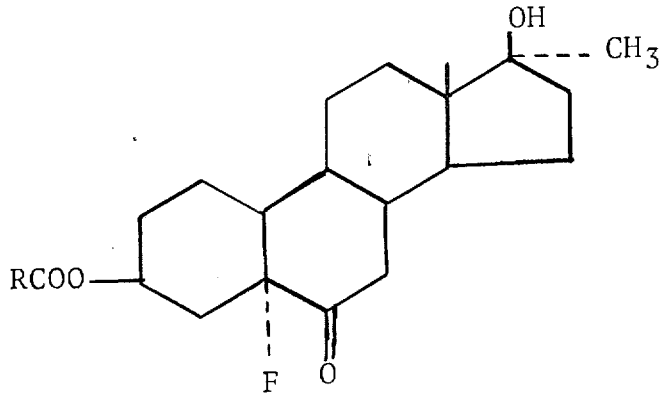

Signed and sealed this 18th day of October 1966.

(SEAL)
Attest:

ERNEST W. SWIDER                      EDWARD J. BRENNER
Attesting Officer                    Commissioner of Patents